J. SUGGETT.
VENTILATING DRIVEN WELLS.

No. 173,103.                    Patented Feb. 1, 1876.

Attest:
John W. Suggett
Jas. A. Nixon

Inventor:
James Suggett

UNITED STATES PATENT OFFICE.

JAMES SUGGETT, OF CORTLAND, NEW YORK.

IMPROVEMENT IN VENTILATING DRIVEN WELLS.

Specification forming part of Letters Patent No. 173,103, dated February 1, 1876; application filed November 8, 1875.

*To all whom it may concern:*

Be it known that I, JAMES SUGGETT, of Cortland, Cortland county, and State of New York, have invented a new and useful Improvement in Ventilating Driven Wells, which improvement is fully set forth in the following specifications, reference being had to the accompanying drawings.

Figure 1:
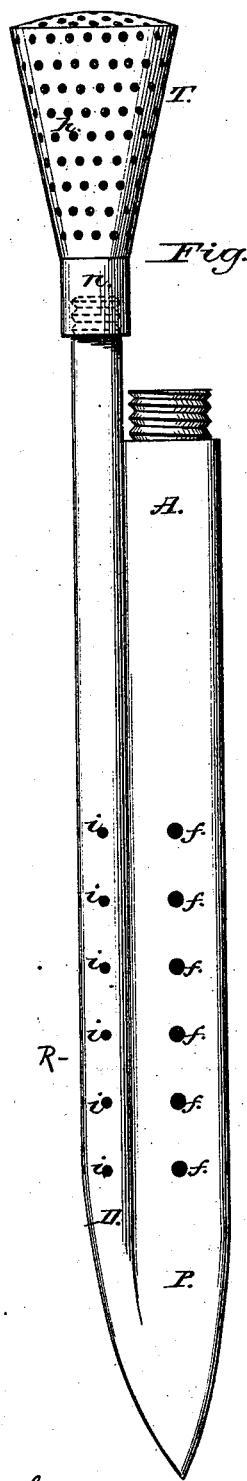

The object of my invention is to furnish a free passage into and out of the water in and surrounding a driven well, in order that all noxious gases and unwholesome air may readily escape, and also that pure air may pass down into the driven well, thereby ventilating it thoroughly; and as it has been a noticeable feature of the common driven well that it pumps hard, and is very difficult to obtain a good supply of water, which I believe to be due, in part, to a meager and scanty supply of air to the perforations or holes in the bottom of the driven-well pipe, which lack of air causes a vacuum to be produced in the pipe when the pump is operated, and, by the atmospheric pressure upon the valves, causes the pump to work hard, which would be relieved or remedied by the use of a second pipe, R, for the admission or exit of air and gases, &c., as heretofore explained, and shown in Figure 1 of the accompanying drawings, this second pipe R, Fig. 1, may be driven down close to, by the side of, inside of, or connected with, the pipe A, Fig. 1, or disconnected from the same. If placed on the inside, this ventilating-pipe is to be so placed and arranged as not to interfere with the proper operation of the pump on the pipe A, Fig. 1. This second pipe R, Fig. 1, may be welded or fastened to the pipe A at the point D, Fig. 1, and then both of said pipes may be brought to a suitable point, P, Fig. 1; or said pipes may be combined together by both being screwed into a suitable point, made particularly for the purpose; or said ventilating or second pipe R, Fig. 1, may be driven down by the side of a driven-well pipe, disconnected, and thus furnish a ventilator for the suction-pipe of the driven well. The holes or perforations $f, f, f, f, f$, and $f$ on the pipe A, Fig. 1, are for the admission of water, and the holes or perforations $i, i, i, i, i$, and $i$ in the ventilating or second pipe R, Fig. 1, are for the entrance and exit of air and gases, and the perforated cap or strainer T, Fig. 1. One of the holes or perforations, being shown at $h$, is for the exclusion of dust, &c., from the pipe. This cap or strainer is screwed to the pipe by the coupling $n$, Fig. 1.

Figure 2:
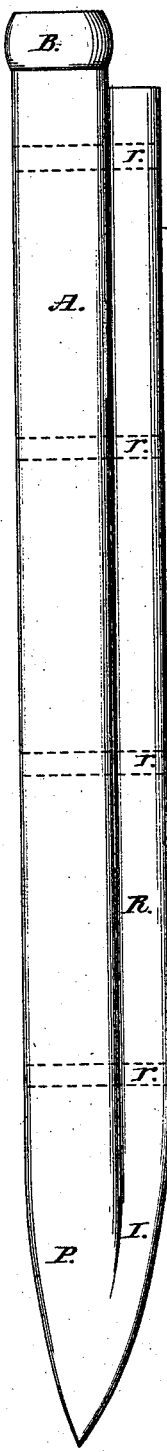

And another object of my invention is to furnish a suitable instrument, consisting of two rods fastened together, in order to make a suitable hole for the insertion of the pipes A and R, Fig. 1. The rod A, Fig. 2, is made of iron or other suitable material, of a diameter larger or equal to the diameter of the pipe A, Fig. 1. The upper end of this rod is formed into a spheroidal shape, B, so that it can be readily driven upon. The second rod, R, Fig. 2, is made of iron or some other suitable material, and of a diameter larger or equal to the diameter of the ventilating or second pipe R, Fig. 1. These two rods—viz., A and R, Fig. 2—are welded together at the point I, and held together by the bending transverse rods or rivets, (shown at $r, r, r,$ and $r$ by the dotted lines;) and both of said rods are brought to a suitable point, P, Fig. 2.

I claim as my invention—

1. The using of a second ventilating-pipe, R, Fig. 1, either separated from, or connected with, or inside or outside of, the suction-pipe of a driven well, for the purpose of ventilating the same, all substantially as set forth.

2. The combination of two rods, A and R, Fig. 2, for the purpose of making a suitable hole for the insertion of said suction and second or ventilating pipes, as substantially described and shown.

JAMES SUGGETT.

Witnesses:
JOHN W. SUGGETT,
JAS. A. NIXON.